April 4, 1961   G. A. LYON   2,977,917
METHOD OF MAKING WHEEL COVERS
Filed Jan. 26, 1956   5 Sheets-Sheet 3

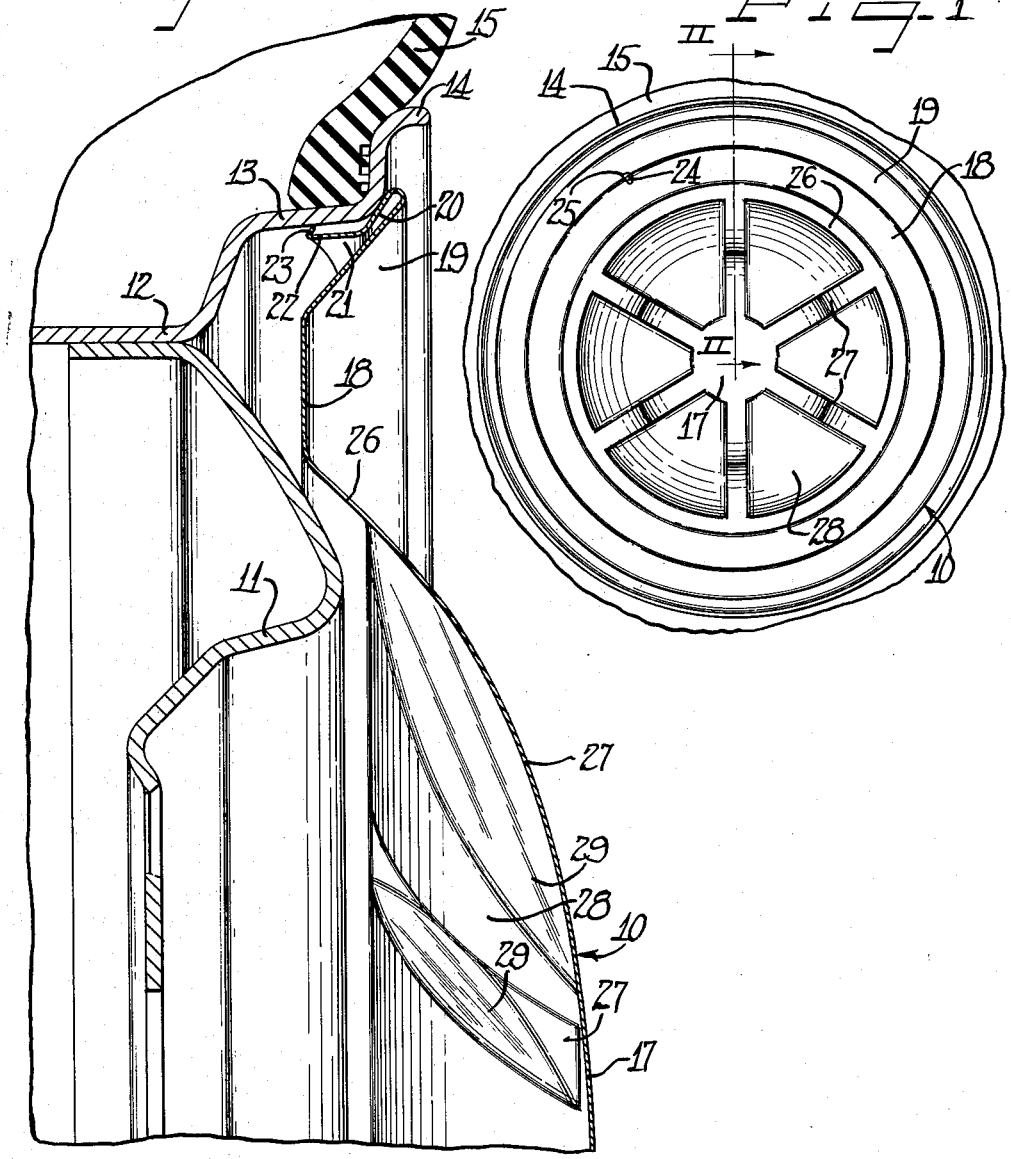

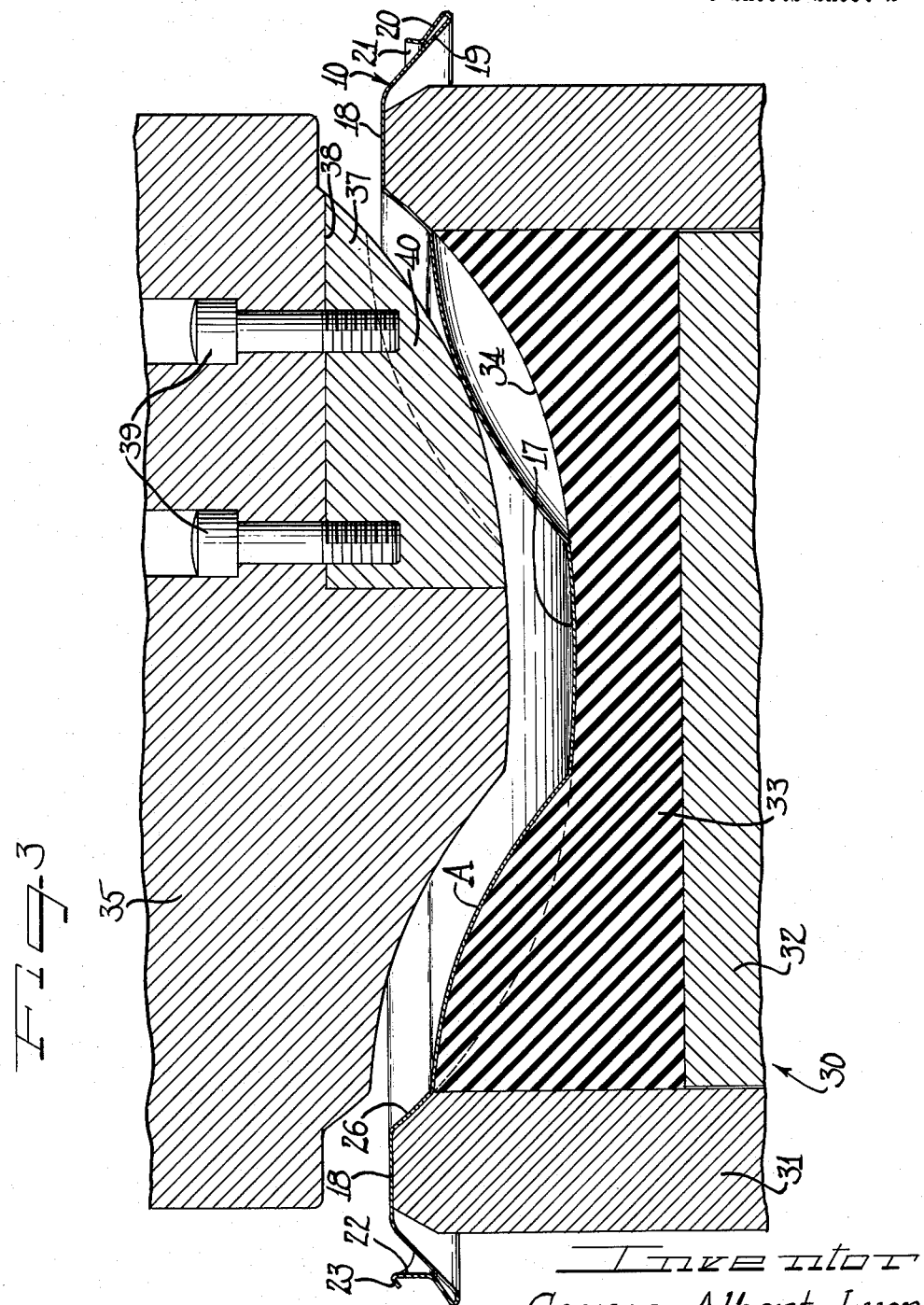

Inventor
George Albert Lyon

April 4, 1961 G. A. LYON 2,977,917
METHOD OF MAKING WHEEL COVERS
Filed Jan. 26, 1956 5 Sheets-Sheet 4

Inventor
George Albert Lyon

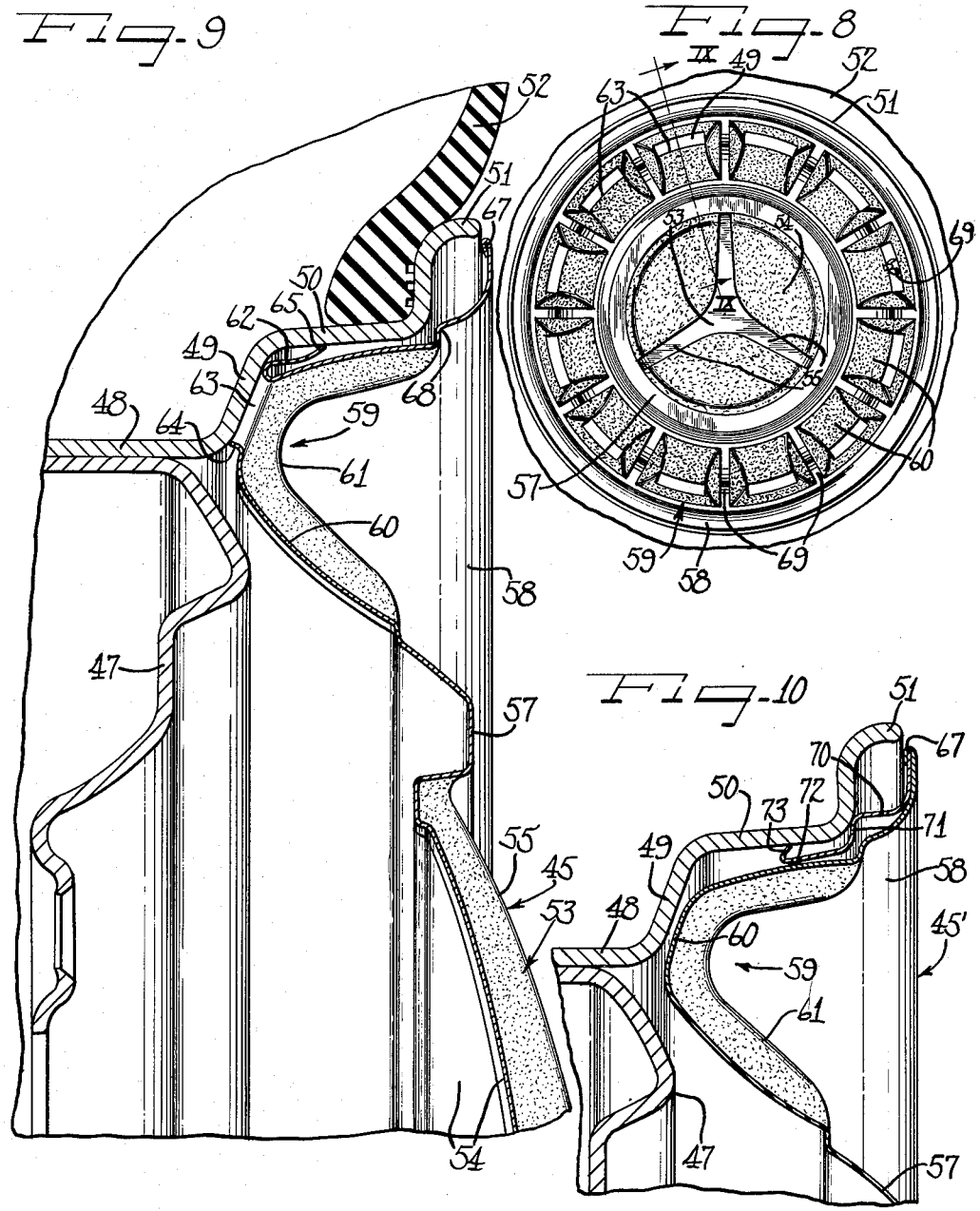

2,977,917

METHOD OF MAKING WHEEL COVERS

George Albert Lyon, 13881 W. Chicago Blvd., Detroit 28, Mich.

Filed Jan. 26, 1956, Ser. No. 561,453

8 Claims. (Cl. 113—116)

The present invention relates to improvements in methods of making covers for disposition at the outer side of vehicle wheels, and more particularly concerns the attainment of novel ornamental effects in such wheel covers.

In the manufacture of wheel covers, sheet metal strip or plate of thin gauge is drawn into desirable configuration generally comprising working the material into circular areas to afford the preferred contour in radial cross-section. It is then desirable to polish the outer face of the cover member in order to afford the finished smooth lustrous surface finish for not only attractiveness of appearance but also ease in cleaning. However, where it is desired to provide configurations in at least certain of the circular areas, the problem arises that production polishing and buffing equipment will operate economically and efficiently primarily on continuous circular areas and where there are recesses or high points or areas interrupting the circular area surfaces costly hand polishing or buffing must be resorted to instead of automatic high speed continuous mass production high speed procedures. At least, it is generally necessary to supplement the automatic high speed polishing and buffing with manual touch-up. This is especially true where the configuration drawing is fairly shallow in depth within the permissible tensile range of the worked material of the drawn circular areas.

During working of the material into the preferred concentric circular area shape, substantial work hardening takes place, and this is especially true where substantial bending, stretching or other shaping of the material is effected incident to the shaping. Therefore, when it is desired to provide rib or spoke-like configurations in generally radial direction across a selected circular portion of the cover by displacing the material of the cover out of the plane of the selected circular area, or depressing portions of the selected circular area or areas, the problem of rupturing of the material is encountered. In such an area the ribbing or depressing displacement has heretofore necessarily been carefully controlled to a fairly shallow depth to avoid rupturing the material. This imposes rather narrow limits upon the depth and thereby the ornamental appearance of the pressed rib or spoke structure or depressed area that may be produced in the selected circular work hardened area.

An important object of the present invention is to provide sheet metal covers with circular drawn areas having novel deeply drawn spoke or spoke-like rib formations or depressed area portions.

Another object of the invention is to provide in a work hardened area of a sheet metal member such as a wheel cover, spoke or rib or depressed, configurations of substantially greater depth than would normally be permitted in such an area without fracturing incident to the drawing of the configurations.

A further object of the invention is to improve substantially the ornamental appearance of vehicle wheel covers made from drawn sheet metal by providing the same with spoke or rib-like or depressed ornamentation of novel substantially contrasting finish appearance.

Still another object of the invention is to attain contrasting ornamental surface appearance in a polished sheet metal surface in which all parts of the surface are initially uniformly polished to a lustrous finish.

Yet another object of the invention is to provide an improved method of and means for providing vehicle wheel covers with spoke-like ribs or grooves or depressions of unusual depth.

Other objects, features and advantages of the present invention will be readily apparent from the following detailed description of a preferred embodiment thereof taken in conjunction with the accompanying drawings, in which:

Figure 1 is an outer side elevational view of a wheel structure embodying features of the present invention;

Figure 2 is a fragmentary enlarged radial sectional view taken substantially on the line II—II of Figure 1;

Figure 3 is a fragmentary vertical sectional view through a die assembly for pressing spoke-like ribs in a circular portion of a cover member;

Figure 8 is a side elevational view of a wheel structure embodying modifications of the ornamental effects attainable by the present invention;

Figure 9 is an enlarged fragmentary radial sectional view taken substantially on the line IX—IX of Figure 8; and Figure 10 is a fragmentary radial sectional view similar to Figure 9 but showing a further modification of the cover.

Figure 4:
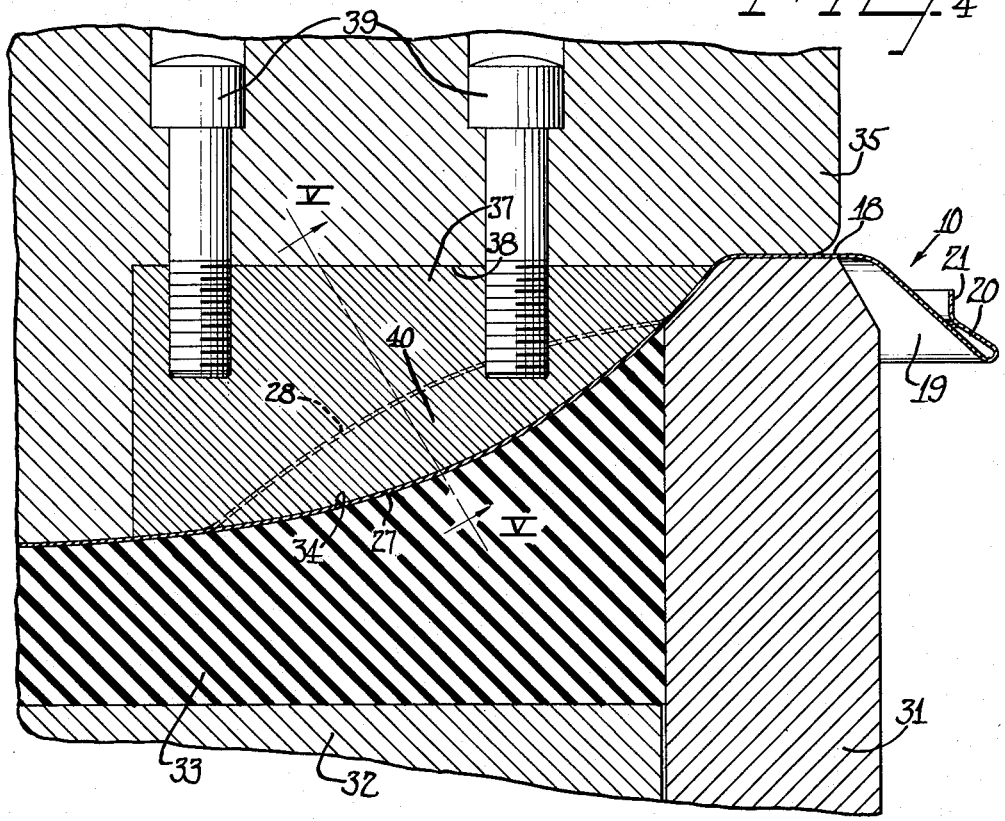
Figure 4 is a slightly enlarged fragmentary vertical sectional view of the right hand portion of the die set shown in Figure 3.

A wheel cover 10 (Figs. 1 and 2) according to the present invention is constructed and arranged to be applied in press-on, pry-off relation to the outer side of a vehicle wheel which may be of the conventional type having a disk spider wheel body 11 carrying a multi-flange, drop center tire rim 12 having an intermediate generally radially inwardly facing and axially and radially outwardly sloping flange 13 merging with a terminal flange 14. The tire rim is adapted to support a pneumatic tire and tube assembly, or a tubeless tire 15 as shown.

The wheel cover 10 comprises a one piece sheet metal stamped and drawn circular body having a central crown portion 17 for overlying the central portion of the wheel body 11 and merging with an intermediate annular inwardly dished portion 18 from which extends generally radially and axially outwardly an outer annular marginal portion 19 for overlying the tire rim 12.

Means are provided for press-on, pry-off retention of the cover 10 on the wheel. Herein such retaining means are of the kind covered in my Patent No. 2,624,634 issued January 6, 1953. To this end the outer marginal portion 19 of the cover has an underturned generally radially and axially inwardly extending continuous flange 20 adapted in assembly to bottom against the outer side of the tire rim adjacent juncture of the intermediate and terminal flanges thereof. Extending generally axially inwardly from the flange 20 is a continuous annular flange portion 21 that is of a smaller diameter than the axially outer portion of the intermediate flange 13 and has a series of generally axially inwardly extending finger extensions 22 provided with cover retaining terminals in the form of short and stiff radially and axially outwardly projecting terminal flanges 23 which are engageable in gripping retaining relation against the inner surface of the intermediate flange 13 under resilient tension of the retaining fingers 22 and the continuous flange 21 from which the fingers extend.

To apply the cover to the outer side of the wheel it is generally centered with respect to the wheel and with a valve stem 24 extending through a suitable valve stem aperture 25 in the marginal portion of the cover. Then the cover is pressed axially inwardly to effect uniform engagement of the retaining fingers 22 with the tire rim flange 13. There may be from 8 to 16 of the retaining fingers 22, as preferred.

In making the cover 10, the method covered in my issued Patent 2,707,449 dated May 3, 1955, may be used.

According to such method, sheet brass of a suitable alloy or sheet steel, more especially stainless steel of suitable type, are worked by stamping and drawing into the desired form of the cover. It is contemplated that suitable sheet aluminum alloy may also be used. All of these materials are cold work hardenable and will take a high lustrous polish, while the brass may be readily nickel plated and the stainless steel may be readily flash chrome plated. Moreover, in the cold working of the cover retaining flange structure 20, 21 and the fingers 22, as well as the overlying outer marginal flange 19 of the cover a high degree of resilience is attained which is quite advantageous for embodying efficient retaining gripping characteristics in the retaining fingers 22 and the retaining terminals 23 thereof.

In order to attain novel, ornamental styling effect, it may be desirable to provide the cover 10 with an arrangement of spoke ribs 27 and intermediate grooved portions 28 in a circular area of the cover body. In the present instance such circular area comprises the side wall of the crown 17. On the other hand, it could just as well comprise the intermediate dished annular cover portion 18. In the illustrative embodiment shown in Figure 1, the outwardly projecting ribs 27 are disposed in generally spoke-like radial arrangement emanating from a central portion of the crown 17 and merging at their ends in an annular radially outer and axially inner extremity portion 29 of the crown adjacent juncture thereof with the dished in annular portion 18 of the cover. The spoke ribs 27 are preferably substantially narrower than the intermediate dished in portions 28 of the crown. Each of the spoke-ribs 27 projects substantially outwardly beyond the dished in portions 28 and has, in the present instance, a crown that is of substantial width and is arched outwardly while opposite side walls 29 merge into the intermediate dished in or depressed portions 28.

In view of the cold working to which the material of the crown 17 is subjected in drawing the same to shape, relative pressing of the material in the circular portion of the crown in which the ribs 27 and the intermediate dished portions 28 are formed would normally have to be carefully controlled to a limited extent in order to avoid rupturing the material. However, it will be observed that the the longitudinal center portions of the ribs 27 they are of quite substantial depth relative to the dished in intermediate portions 28. This is accomplished according to the present invention by selectively or locally annealing the circular area of the cover in which the ribs 27 are formed. That is, after the cover has been fully drawn and shaped including formation of the cover retaining underturned marginal flange structure, the circular area of the cover to be ribbed is fully annealed to return it substantially to the original unworked softness. Since it is highly desirable to maintain full work hardening and thereby resilience in the outer marginal portion 19 and the retaining flange structure 20, 21 and the fingers 22, such portions of the cover are carefully shielded and protected against annealing thereof.

Satisfactory annealing results can be secured by electronic induction heating or by gas heating the selected circular area of the cover body. For example, with AISI type 301 chromium-nickel stainless steel, heating of the selected circular area of the cover body to 1750–2000° F. for approximately seven seconds by induction heating will produce the desired annealed effect. With gas heating of the selected area, the annealing temperature may be held for approximately forty seconds after the temperature is attained following application of the gas heat.

If preferred, the selected annular area may be annealed by the salt bath process, wherein a suitable salt is maintained in a molten condition at the proper annealing temperature. For said chromium-nickel stainless 1800° F. to 1975° F. for one minute has been found suitable.

With other types of material, such as AISI type 430 stainless ferritic chromium steel having a lower recrystallization temperature, the annealing temperature must, of course, be held properly to not over 1500° F. Proper adjustments in this regard will therefore be in order conformable to the material employed.

In the present instance, since the spoke-ribs 27 are the narrowest relative to the intermediate portions 28, a preferred mode of shaping comprises initially drawing the side of the crown 17 into a circular dished form A (Figure 3) conformable to the desired dished configuration of the ultimate indented intermediate portions 28. Since in this condition of the cover the outer surface configurations are all of circular pattern the outer surface of the cover is conveniently polished to a high luster in automatic high speed equipment. However, before polishing, the circular dished section A is annealed to substantially dead soft, that is to substantially the softness of the material before cold working.

Then, for pressing the spoke ribs 27 in the annealed section A, the polished cover is inserted into a die set 30. This includes a circular upstanding supporting die ring member 31 which is conformed to engage within the intermediate dished portion 18 and against the circular crown extremity portion 29. Supported in secured relation on a base 32 and confined closely within the supporting die ring 31 is a female shaping die block 33 which is formed from an elastomeric resilient material such as rubber and has the upper surface thereof shaped conformable to the outer surface of the crown 17 and the dished surface of the circular annealed cover portion A. At intervals corresponding to the ribs 27 to be formed in the annealed portion A, the cushion die block 33 is provided with radial slots 34 which are of complementary shape to the outer surface to be formed on the ribs 27. It will be observed that the outer, polished surface of the cover is placed upon the rubber die member 33.

Cooperatively related to the lower supporting die assembly is an upper punch die member 35 which has a lower surface which is generally conformed to the inside surface of the cover crown including the dished in annular portion A. At the circumferentially spaced positions conformable to the ribs 27 to be formed in the cover portion A, and complementary to the groove or slot recesses 34 in the cushion die member 33, the punch die 35 has hardened steel block rib forming inserts 37 secured in suitable recesses 38 in the face of the die member by means of screws 39. This enables the rib forming insert blocks to be made of a harder material than the rest of the punch 35 and to be removed when necessary for sharpening or replacement.

Figure 5:
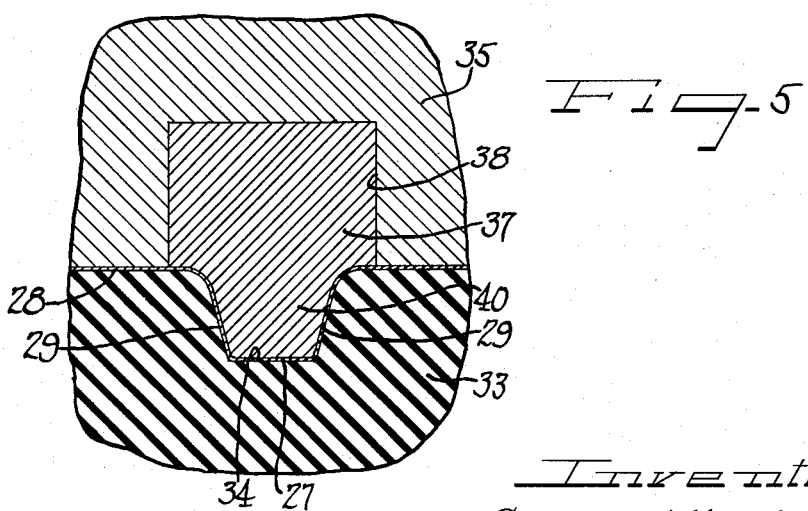
Figure 5 is a fragmentary sectional detail view taken substantially on the line V—V of Figure 4.

Upon comparison of Figure 3 with Figure 4, it will be observed that when the punch die 35 is driven down against the cover, rib forming projections 40 of the inserts 37 registering with the rib grooves 34 of the cushion and forming block 33 will draw and bend the material of the section A overlying the grooves 34 into the grooves and thus form the ribs 27 therein. As seen in Figure 5, the forming nose extensions 40 are complementary to and in the fully pressed in relation fit down into the forming grooves 34 to afford smooth uniform shape to the pressed ribs 27, while the remainder of the annealed section A of the cover remains in the dished original shape to provide the intermediate sections 28. It will be observed that by having the bottoms of the grooves 34 merge smoothly with the peak 17 and with the crown extremity portion 29 at the opposite end, the resulting crowns or ridges of the spoke ribs 27 will merge similarly as best visualized in Figures 2 and 4.

The cushioning resilient nature of the female die block 33 avoids marring of the polished surface of the cover during the rib drawing operation.

After the ribs have been formed, the die sections are separated and then formed cover 10 removed. The outer surface of the cover is then buffed and degreased and if desired is plated.

It has been found that the annealing enables much deeper drawing of the ribs than when the area A is not annealed. Furthermore, a highly desirable result of the deep drawing of the spoke ribs 27, as accomplished by the described method, resides in that the spoke ribs, or at least the outer surfaces of the sides 29 of the spoke ribs are provided with substantially contrasting finish appearance as compared to the surface of the intermediate portions 28 or the remainder of the outer face surface areas of the cover, especially where the entire outer surface of the cover has been polished prior to the rib drawing steps. This contrasting finish effect arises due to the stretching of the material in the ribs when displacing the same from the dished original position of the material to the final deeply drawn displaced position thereof. Due to such stretching, the polished surface assumes a satiny, non-lustrous appearance. Where the crests of the ribs 27 are, subsequent to the drawing thereof, buffed, they will resume a polished or shiny appearance but the sides 29 of the ribs will remain with the satiny finish. Plating of the outer face of the cover as by flash chrome plating maintains the contrasting finish of the several surface areas. Thus, there is afforded a desirable contrast in the finish of the cover emphasizing the spoke ribs in the finished cover. Of course, if a more intense contrast is desired the intermediate areas 28 may be painted or enameled but this adds a cost factor that is unnecessary in view of the novel contrasting finish attainable as described hereinabove.

Figure 6:
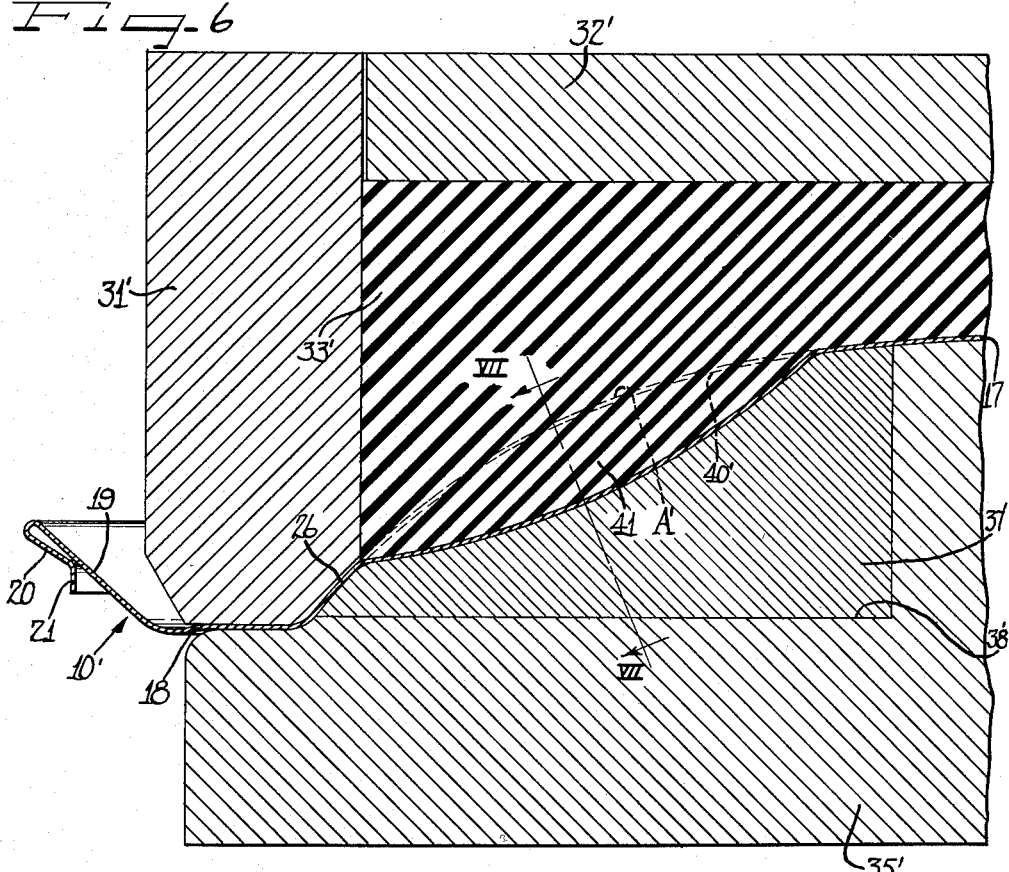
Figure 6 is a fragmentary vertical sectional view through a modified die assembly taken substantially in the plane of the line VI—VI of Figure 7.
Figure 7:
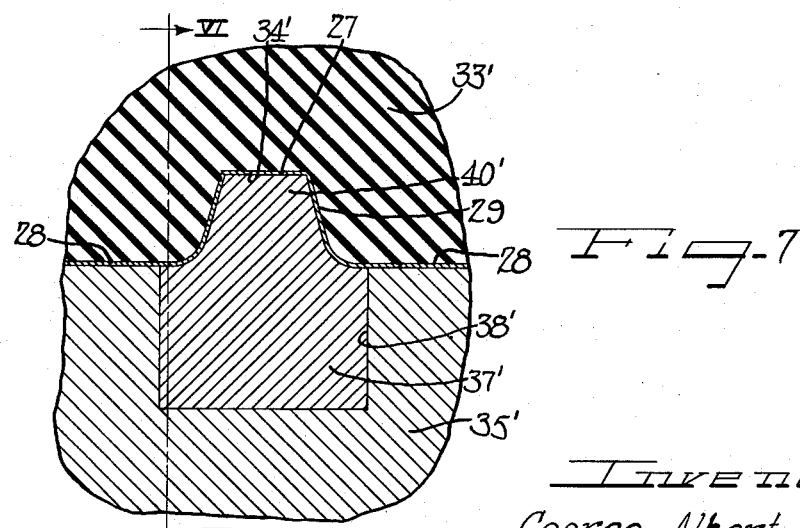
Figure 7 is a fragmentary sectional detail view taken substantially on the line VII—VII of Figure 6.

It has been found that a highly desirable ornamental effect is attained where instead of ribs or spoke configurations being pressed out of a dished area, the areas intermediate the desired spoke or rib configurations are pressed or displaced to provide depressions of substantial depth between the spoke portions. In such event not only the sides of spoke portions but also the entire depressed areas between the spoke portions are provided with the satiny finish. For this purpose the forming die structure of Figures 3, 4 and 5 is reversed as shown in Figures 6 and 7. That is, the punch portion 35 becomes a female die member 35′ supporting a series of hardened rib die blocks 37′ mounted in appropriate recesses 38′ in the die member 35′. In this instance, however, the rib or spoke noses or projections 40′ of the blocks 37′ are shaped on their crests to the same longitudinal contour as the transverse or radial contour of the dished circular annealed and polished area A′ of the cover blank which for this purpose is initially dished into outwardly convex form such as a continuation of the crown contour of the cover member.

In this modification, the die structure that in Figures 3 through 5 was the supporting structure becomes the male punch structure and includes the ring die member 31′ and a base die member 32′ providing a cavity within which a rubber or other suitable elastomeric pressure die member 33′ is mounted. After the cover member has been centered upon the lower die member 35′ with the circular portion A′ resting upon the ribbing die members 37′, the die assembly 31′, 32′, 33′ is driven down into engagement with the axially outer face of the cover member. This causes annularly aligned portions 41 of the resilient forming die member 33′ intermediate the rib forming recesses 34′ complementary to the ribbing die portions 41′, and bulged oppositely to the initial or normal convex bulge of the cover portion A′, to stretch and draw the areas of the cover portion A′ between the ribbing die portions 40′ generally axially inwardly to provide corresponding depressed areas 28 in the cover. Since the thus depressed and stretched areas 28 and the rib sides 29 are worked relative to the crest portions of the ribs 27, which in this modification of the method are maintained unstretched and in the original plane of the cover portion A′, the originally polished surface of the cover areas 28 and the rib sides 29 are converted into a substantially uniform satin finish. This affords an overall pleasing contrasting finish for the depressed cover areas 28 and the rib sides 29 and the crests of the ribs 27 as well as the contiguous crown 17 as well as the radially outer adjacent annular cover areas 26 and 19 which remain in the highly polished condition. Furthermore, even though the relative drawing of the areas 28 is substantial and deep, tearing or buckling or undue strain upon any portion thereof is avoided due to the annealing to which at least the area A′ has been subjected prior to the drawing of the areas 28.

Many and varied ornamental effects and combinations can be attained by the present invention. Thus, in addition to the examples already described herein, another interesting example is shown in Figures 8 and 9 wherein a cover 45 of the full disk type is shown adapted for disposition over the outer side of a vehicle wheel including a wheel body 47 supporting a tire rim having the usual base flange 48, outer generally radially outwardly directed and axially outwardly facing side flange 49, generally axially outwardly directed and radially inwardly facing intermediate flange 50, and terminal flange 51 constructed and arranged to support a pneumatic tire and tube assembly or tubeless tire 52.

On the cover 45 those areas which have been drawn to afford a satin finish are depicted in a more or less stippled fashion in order to afford a contrast on the drawing for those areas which retain the polished surface condition. A central crown portion 53 of the cover may have a plurality of symmetrically disposed depressed areas 54 provided with a satin finish and separated by a pattern of connected radiating polished crested spokes 55 which merge into an annular polished crown side bordering area 57.

Joined to the crown 53 in radially outwardly spaced relation and adapted to overlie the terminal flange 51 of the wheel is an outer marginal polished rib-like annular cover portion 58 with a deeply inwardly dished annular intermediate junction cover portion 59 between the crown and the outer marginal cover portion and arranged to fit into the wheel in generally telescoped relation to the tire rim and more particularly the intermediate flange 50.

In this instance, the intermediate cover portion 59 is provided with a symmetrical annular series of depressed or pressed in satin finish areas 60 separated by polished crest generally radially extending but inwardly dished ribs or spoke-like areas or portions 61 which in this instance are substantially narrower than the intermediate satin finish areas 60. At their opposite radially inner and radially outer ends, the spoke ribs 61 merge with the polished crown area 57 and the outer marginal portion 58 of the cover, respectively.

In view of the extensive area involvement in satin finish of the cover 45, the entire cover plate is preferably annealed after the general contour drawing thereof and before polishing and drawing of the satin finish areas. Since the areas of the cover provided with the satin finish, including the large axially outwardly facing areas 54 and 60, as well as the side areas of the respective crown ribs 55 and the intermediate portion rib 61, and the substantial work hardening to which such areas are subjected by the cold drawing thereof to effect the satin finish, a substantially reenforced structure results in the completed cover to compensate for the overall softening of the cover plate as an incident to the annealing thereof.

For retaining the cover 45 on the wheel, self-retaining finger structure is provided, in the present instance comprising a series of generally axially outwardly projecting resilient fingers 62 provided in one piece integrally with the intermediate cover portion 59 by striking out of material from apertures 63 formed in the lowermost portions of the depressed satin finish areas 60 opposite the side flange 49 of the tire rim. Each of the apertures 63 is provided with a continuous generally axially inwardly extending narrow reenforcing and finishing flange 64 thereabout from the radially outer portion of which the retaining fingers 62 project as return bent extensions. At their axially outer terminals the retaining fingers 62 are provided with relatively short and stiff generally axially outwardly directed retaining terminals 65 that engage with retaining gripping thrust with the intermediate flange 50. The space between the generally radially outwardly facing radially outer side of the dished intermediate portion 59 of the cover and the intermediate flange 50 is sufficient to accommodate the retaining fingers 62 for resilient radial flexing so that when the cover is applied to the wheel, the retaining fingers 62 are adapted to flex from a greater diameter projection of the retaining terminals 65 to the diameter of the intermediate flange 50 as the cover is pressed axially inwardly and the retaining finger terminal 65 cam inwardly along the inner face of the intermediate flange. The resilient tension developed in the retaining fingers 62 causes the terminals 65 to engage quite firmly with the intermediate flange.

It will be understood that the retaining fingers 62 are punched from the depressed satin finish areas 60 after the working of the areas 60 and hardening thereof, so that the material of the fingers 62 is work hardened as an incident to the working of the areas 60, and then the fingers are further work hardened as the same are bent around into the return bent relation to project generally axially and radially behind the cover for engagement with the intermediate flange of the tire rim. This affords the substantial resilience in the retaining fingers 62 desirable for their wheel engaging and cover retaining function.

Since the retaining fingers 62 are of work hardened resilience, the cover can be readily pried from the wheel by means of a pry-off tool inserted behind an outer turned bead-like edge extremity reenforcement 67 opposite the tip of the terminal flange 51 and then behind a reenforcing and pry-off annular shoulder 68 spaced inwardly from the edge of the cover and preferably opposite the juncture between the intermediate flange 50 and the terminal flange 51. As the pry-off force is applied, the retaining fingers 62 tend to retain their engagement with the rim flange but due to the substantially axially outward extension of the fingers and thereby axially outward leverage imposed incident to the pry-off force, the finger terminals 65 are forced to relinquish their grip progressively as pry-off force is applied at successive points annularly about the cover until the cover has been released.

Not only for accommodation of wheel balancing weights behind the outer marginal portion 58 of the cover, but also for facility in insertion of a pry-off tool therebehind, the arrangement is such that the flanges 64 about the openings 63 engage against the side flange 49 of the tire rim as stops determining the axially inward disposition of the cover. In addition, this supports the cover free from the wheel body 47. It may also be observed that the ornamental effect can be heightened by having the tire rim and especially the side flange 49 thereof painted a desired color. While this color may be black, it may be any other preferred color.

It may also be noted that the apertures 63 are so disposed that a valve stem 69 is accommodated through one of the apertures.

Where preferred, the cover may be provided, instead of with retaining fingers integrally in one piece therewith, with separately formed and attached retaining structure. To this end, attention is directed to the modification of Figure 10 wherein a cover 45′ is shown which in most respects may be identical with the cover 45 and arranged for disposition at the outer side of a vehicle wheel the same as the vehicle wheel in Figure 9, similar reference numerals identifying like parts in the cover of Figures 9 and 10 and the wheel. However, the cover 45′ is equipped with a retaining ring 70 having a marginal portion crimped retainingly in place behind the outer marginal cover portion 58 by the underturned reenforcing and finishing bead flange 67. An intermediate annular stepped shoulder 71 in the retaining flange 70 is adapted to engage against the terminal flange 51 adjacent juncture thereof with the intermediate flange 50 for determining the axially inward disposition of the cover on the wheel. At its axially inner margin the retaining flange 70 has a series of generally axially inwardly extending resilient retaining fingers 72 which are radially flexible in the space between the inset intermediate cover portion 59 and the intermediate flange 50. Short and stiff generally radially and axially outwardly oblique turned retaining terminals 73 on the fingers 72 are engageable in retaining gripping relation against the inner face of the intermediate flange 50 for retaining the cover on the wheel. The construction and operation of the fingers 72 is preferably substantially like the construction and operation of the retaining fingers 22 in the cover of Figure 2. It will be understood, of course, that although the satin finish pressed in areas 60 are not apertured in the cover 45′, one of such areas may have a suitable aperture therein for receiving the valve stem 69 therethrough.

It should be observed that the satin or satiny finish produced according to the present invention is something quite different from a frosted or rubbed finish. A frosted finish may be effected by etching or sand blasting whereby particles are removed by the etching solution or by the sand grains impinged at high velocity against the surface or displaced by the force of the sand grains to form pits in the surface, whereby to effect diffusion of light striking the surface that has been treated. The result of etching or sand blasting is to effect an alteration of the surface by externally applied means. Such means are necessarily applied after the article has been drawn to shape and in the case of intricate shapes, especially, are very difficult to apply uniformly so as to gain a uniform finish. In any event, the superficial surface alteration mode of treatment is time consuming and expensive.

On the contrary, the method of the present invention effects an internal structural change in the characteristics of the material in the worked polished surface areas whereby the satin non-lustrous, that is dull, finish results from the actual grain displacement to a degree sufficient to break up their smooth polished orientation whereby the uniform quite smooth light diffusing satin finish is attained. Best results have been produced where in the annealing the grain size is controlled to be between seven and nine according to the ASTM Standard Classification of Austenite Grain Size in Steels, and also found in the current edition of the SAE Handbook. In a wheel cover the smoothness and uniformity of the satin finish surface with freedom from tool marks or pits or other surface irregularities or roughness is of substantial importance since the surfaces of wheel covers are inherently subject to road dirt adherence in service and must be easily cleanable.

It will be understood that modifications and variations may be effected without departing from the scope of the novel concepts of the present invention.

I claim as my invention:

1. In a method of making a sheet metal wheel cover, drawing a sheet metal member into circular cold worked highly resilient portions with one of said portions dished to a substantial extent, exclusively annealing said dished portion while shielding an adjacent circular portion of the cover against annealing thereof so as to maintain said adjacent portion in the hard resilient condition, and pressing deep ribs in the annealed portion in the opposite direction to the dishing thereof.

2. In a method of making wheel covers, drawing a sheet metal member into concentric circular cold work hardened areas with one of said areas dished substantially in one axial direction, annealing said dished area to a soft anneal, drawing spaced portions of said annealed area to afford a series of spoke-like ribs to project substantially in the opposite axial direction from the dishing of said one area and intermediate portions of the area between said ribs and with the ends of the spoke ribs merging with the adjacent areas of the cover member.

3. In a method of making a wheel cover, drawing a thin sheet metal blank into circular concentric portions with one of said portions dished annularly relative to the remainder of the blank, annealing the blank to return said dished portion to a soft annealed state, then polishing the blank including said dished portion, after the polishing drawing a symmetrically spaced series of substantial size ornamental areas of said dished portion into depressed form to thereby stretch the polished surfaces of the depressed areas and by the stretching effecting a degree of grain displacement sufficient to break up their smooth polished orientation for thus converting the same into a uniformly smooth dull satiny light-diffusing appearance in contrast to adjacent unstretched polished surface areas of the blank, and after the depressing drawing striking out portions of the depressed satin finish areas and working such portions into resilient cover retaining fingers, the fingers thereby having the benefit of not only the depression working but also the working thereof subsequent to the striking out so that the material of the fingers will finally be substantially work hardened.

4. In a method of making wheel covers, cold work drawing a metal member to provide substantial hardness therein, thereafter annealing a circular portion of said member, thereafter polishing the surface of the member inclusive of said circular portion, then deeply drawing areas in said annealed circular portion into ribs having crests and thereby stretching the material in the ribs to effect a degree of grain displacement in the polished surfaces of the ribs to break up the smooth polished orientation of the grain in such polished surface areas whereby they present a uniformly smooth dull satiny light-diffusing appearance in contrast to adjacent unstretched polished surface areas of the member, and buffing the crests of the ribs to afford a substantial contrast between the crests and sides of the ribs.

5. In a method of producing contrasting ornamental finish effects in a sheet metal member susceptible of taking a high polish, the steps of polishing a surface of the member, and drawing a configuration having substantial exposed ornamental surface area in a portion of said surface to the extent of stretching the material of the ornamental surface area of the configuration to effect a degree of grain displacement sufficient to break up their smooth polished orientation whereby the stretched surface area presents a uniformly smooth dull satiny light-diffusing appearance in contrast to adjacent unstretched polished surface areas of the blank.

6. In a method of making metal articles such as wheel covers from thin sheet metal, drawing and work hardening a sheet metal blank into circular contours, then annealing at least a circular portion of the drawn blank, thereafter polishing a surface of the drawn blank including the annealed portion, and then further drawing at least a selected area of said polished annealed portion to uniformly stretch the material of said area to effect a degree of grain displacement sufficient to break up their smooth polished orientation whereby said area presents a uniformly smooth dull satiny light-diffusing appearance in contrast to adjacent unstretched polished surface areas of the blank.

7. In a method of making a thin sheet metal article such as a wheel cover, drawing a metal blank into circular shape including a plurality of concentric circular portions of varying radial contour, annealing the blank, thereafter polishing the blank on one face thereof, and following the polishing drawing one of said portions to stretch the polished surface thereof to effect a degree of grain displacement sufficient to break up their smooth polished orientation whereby it presents a uniformly smooth dull satiny light-diffusing appearance in contrast to adjacent unstretched polished surface areas of the blank.

8. In a method of making a wheel cover, drawing a thin sheet metal blank into variously contoured portions with one of said portions being dished annularly relative to the remainder of the blank, annealing the blank to return said dished portion to a soft annealed state, then polishing the annealed blank including said dished portion, and after the polishing drawing a symmetrically spaced series of substantial size ornamental areas of said dished portion into depressed form to thereby stretch the polished surfaces of the depressed areas and by the stretching effecting a degree of grain displacement sufficient to break up the smooth polished orientation of the grain whereby said areas present a uniformly smooth dull satiny light-diffusing appearance in contrast to adjacent unstreched polished surface areas of the blank.

References Cited in the file of this patent

UNITED STATES PATENTS

| Number | Name | Date |
| --- | --- | --- |
| 1,636,111 | Rode | July 19, 1927 |
| 1,985,908 | Zerk | Jan. 1, 1935 |
| 2,127,600 | Hunt | Aug. 23, 1938 |
| 2,156,439 | Takeda | May 2, 1939 |
| 2,163,004 | Lyon | June 20, 1939 |
| 2,239,368 | Lyon | Apr. 22, 1941 |
| 2,330,228 | Lyon | Sept. 28, 1943 |
| 2,356,457 | Gonda | Aug. 22, 1944 |
| 2,358,984 | Lyon | Sept. 26, 1944 |
| 2,544,705 | Lyon | Mar. 13, 1951 |
| 2,662,499 | Lyon | Dec. 15, 1953 |
| 2,674,495 | Lyon | Apr. 6, 1954 |
| 2,707,449 | Lyon | May 3, 1955 |
| 2,757,977 | Lyon | Aug. 7, 1956 |

FOREIGN PATENTS

| Number | Country | Date |
| --- | --- | --- |
| 157,253 | Australia | June 25, 1954 |

OTHER REFERENCES

"German Practice in Fabrication of Gas Turbine Blades" by Joseph Robingson, "Fiat Final Report 1129" pub. by Office of Military Government for Germany (U.S.), Field Information Agency, Technical, U.S. Dept. of Commerce, p. 2 relied on.

AIRD, "Speed and Precision Required in Manufacture of Ford Hub Plates," The Modern Industrial Press, June 1947, pp. 13, 14, 16 and 18.